United States Patent [19]

Chou et al.

[11] Patent Number: 5,337,357
[45] Date of Patent: Aug. 9, 1994

[54] METHOD OF SOFTWARE DISTRIBUTION PROTECTION

[75] Inventors: Wayne W. Chou, Ridgefield; Joseph M. Kulinets; Laszlo Elteto, both of Stamford; Frederik Engel, Wilton, all of Conn.

[73] Assignee: Software Security, Inc., Stamford, Conn.

[21] Appl. No.: 97,705

[22] Filed: Jul. 27, 1993

Related U.S. Application Data

[63] Continuation-in-part of Ser. No. 79,093, Jun. 17, 1993, abandoned.

[51] Int. Cl.⁵ ............................ H04L 9/00; H04L 9/08
[52] U.S. Cl. ................................. 380/4; 380/21; 380/23; 380/25; 380/49; 340/825.31; 340/825.34
[58] Field of Search ............... 380/4, 21, 23, 24, 25, 380/43, 49, 50; 340/825.31, 825.34

[56] References Cited

U.S. PATENT DOCUMENTS

| | | | |
|---|---|---|---|
| 4,649,233 | 3/1987 | Bass et al. | 380/21 |
| 5,056,140 | 10/1991 | Kimbell | 380/23 |
| 5,144,667 | 9/1992 | Pogue, Jr. et al. | 380/25 X |

Primary Examiner—Bernarr E. Gregory
Attorney, Agent, or Firm—Parmelee, Bollinger & Bramblett

[57] ABSTRACT

A method is provided for protecting distributed software which relies on a unique factor such as an accessible serial number or the generation of a profile or fingerprint of the computer of the user which is entered individually and/or with a random factor to generate a unique first key which will differ for different computers. The first key is sent to a processing center which then generates a second key. The user applies the second key which compares the unique and/or random factors. If the comparison matches, the first and second keys are used in an algorithm in the software to generate a decrypting key permitting the customer to purchase the selected program(s).

6 Claims, 1 Drawing Sheet

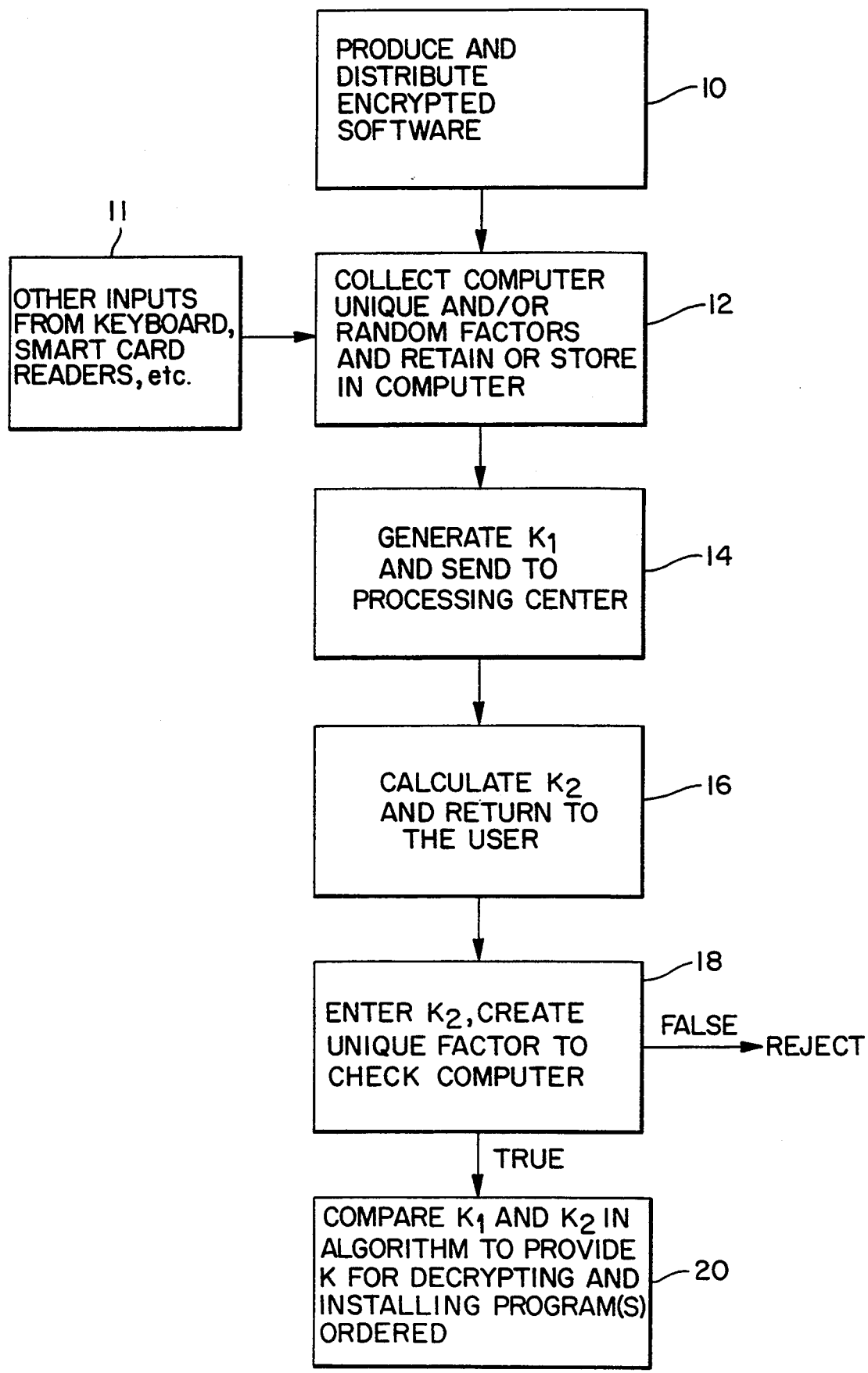

METHOD OF SOFTWARE DISTRIBUTION PROTECTION

RELATED APPLICATION

This application is a continuation-in-part of application Ser. No. 08/079,093 filed Jun. 17, 1993, now abandoned.

BACKGROUND OF THE INVENTION

This invention relates to the protection of software, software transmission, data transmission, etc., and more particularly to the protection of distributed data from unauthorized use in contrast to the prevention of copying of programs or protection of programs by execution control means.

Generally, the primary purpose of software protection is to prevent the duplication and use of a program without the purchase or payment of a fee. A number of solutions have been advanced to deal with such problems, e.g., U.S. Pat. Nos. 4,562,306; 4,932,054 and 5,081,676. All require additional hardware which probably would not be economically viable in a mass mailing type distribution of software.

A different problem is encountered when some type of distribution is used to market the program in contrast to direct point of sale marketing. In one such an arrangement the program may be mass produced, e.g., records in the form of CD ROMs, and sent out by a mailing. Such CD ROMs can combine a multiplicity of independent programs or related programs which may be selected individually or in different combinations. The idea is then to restrict the possibility to use a particular program only to those willing to pay for that program and to prevent others who have not obtained authorization from such use. For example, if the user must call in to get a key which is then used to run a particular distributed program and this key is the same for all copies of this program, there is nothing to prevent the caller from simply giving the key to a third party who then may access the program without paying for such use.

SUMMARY OF THE INVENTION

Accordingly, it is an object of this invention to provide protection in software program distribution for programs which are distributed and are then limited in use to those who request and pay for the privilege of using the program without employing additional external hardware.

Another object of this invention is to restrict the use of distributed programs to those willing to pay for the program use in an efficient, cost effective and simple manner while limiting unauthorized use of the distributed programs.

In carrying out this invention in one illustrative embodiment thereof, a method of protecting distributed encrypted software of a distributor from unauthorized use of a user comprises the steps of utilizing a unique factor, e.g., a file which constitutes a fingerprint of the computer of the user, or a key constituting an integral computer part, or a random factor, e.g., time of entry, utilizing the unique factor or random factor or a combination thereof in the user's computer, generating a first key based on said use, sending said first key to a processing center, generating a second key from said processing center to the user, applying the second key to the user's computer in which said entry is checked and using the second key with said first key in an algorithm to provide a key for decrypting the distributed software.

BRIEF DESCRIPTION OF THE DRAWING

The invention, together with further objects, advantages, aspects and features thereof, may be more clearly understood from the following description taken in connection with the accompanying drawing. The drawing is a flow chart illustrating the method employed in the present invention.

DESCRIPTION OF THE PREFERRED EMBODIMENTS

The present invention is primarily directed to distribution protection of software as distinguished from copy protection but can be used in either. In the copy protection application, software is generally sold and issued individually to users. With this kind of software distribution, the issuer is desirous to prevent the copying of the programs which have been individually sold in order to prevent unauthorized copying and use without proper license or authority. This is distinguished from the distribution of software which may be made, for example, by mailings, which is the case here. The emphasis in the present method is not on preventing the copying but preventing unauthorized use of the distributed copies which are in the field. The problems are related in that unauthorized use is desired to be prevented in both cases but in the former case the prevention of copying is primary while in the latter case of some form of distribution is to limit and control the use of the distributed program(s). The methods dealing with both problems could compliment each other. The methods involved herein apply to software which is herein defined as including and applying to data, data transmission such as digitized communications, or other digital information.

In the distribution of the software, for instance, a CD ROM which may be pressed like records and is issued by mailings to prospective customers, the software is usually encrypted. Unless the recipient has a key or some way of decrypting the mailed program, use cannot be made thereof. Accordingly, the issue is to devise a system which provides a key which is distinctive to a particular recipient's or user's computer so that the provided key cannot be readily passed from one user to another. In accordance with the present invention, a unique factor such as a profile or fingerprint of the user's computer or integral key, or a random factor such as time of entry or a combination of unique and random factors, is utilized in the computer of the user, thereby providing a unique collection of information which can be used to generate a unique key for each computer which will differ for each prospective user.

A unique factor which can be employed is a key which can be accessed and incorporated in the user's computer by the computer manufacturer in the form of a chip, e.g., ROM, etc. Another unique factor which can be used is the fingerprint or profile of the computer which is a piece of information that combines certain physical data describing this particular computer, such as the configuration of the computer prior to the installation of distributed software, physical addresses per se or of certain system files on a hard drive, checking sums of the contents of certain system files, etc. Such fingerprints are pretty unique for computers that already are in use, but such fingerprints can be identical for newly purchased computers which have the same configuration. This is one reason for the use of a random factor for the computer and better still a combination of unique and random factors. The random factor could be, for example, based on the real time sampled during the installation process. In such a case the computers having identical physical characteristics will have different random factors, e.g., based on the time of the start of execution of the installation routine on each computer. Of course, if a manufacturer integrally provides a unique factor such as an accessible serial number, each serial number will be unique for each computer.

The unique factor or fingerprint can also comprise a condensed version of the computer profile and may include other attributes which distinguish one computer from another.

In accordance with the present invention, the distributed programs may be a multiplicity of independent or related programs which the user can buy separately or in combination. The different programs or combinations are encrypted using different encryption keys and different encryption algorithms which accompany the programs on the mass distributed media, e.g., CD ROMs.

Referring now to the drawing, the distributed encrypted software program 10 which has been produced and distributed includes an unencrypted installation part or unencrypted separate installation utility. This installation utility, when applied to a user's computer, will extract all the information from the computer to provide a unique factor, e.g., form a computer profile and/or a random factor, e.g., the time of entry measured in second intervals, for example, in one tenth or one hundredth of a second intervals which may be entered in the computer, as shown in block 12 of the drawing. The entry, for example, can be made by pressing a key on the computer or may be done automatically by direction from the installation utility. As shown in block 11, other inputs from the keyboard, magnetic or smart card readers, etc. may be applied to the computer for providing unique and/or random factors which are entered.

The aforesaid file referred to as the installation data file is stored on the computer hard disk. The installation utility reads the installation data file and based on its contents, generates a first key $K_1$ that is presented to user as shown in the block 14.

The user then calls an 800 number or otherwise communicates with a central processing center which controls the use of the distributed program and provides $K_1$ to the processing center as shown in block 14 of the drawing. The processing center calculates a unique second key $K_2$ for each purchased program or combination of programs based on a known decrypting key K and $K_1$ received from the user which is related to the user's unique and/or random factors. The second key $K_2$ is then sent to the customer as indicated in block 16 of the drawing.

The user then enters $K_2$ in his computer as illustrated in block 18. The computer reads the installation data file containing the unique and/or random factors, creates for the second time the unique factor, e.g., integral unique key in computer, computer profile or fingerprint if it was presented and compares it with the same factor from the installation file. If a valid comparison does not exist and the computer has a different unique factor, a rejection occurs which prevents the use of the distributed software. This could result from copying the installation data file and transferring it to another computer in trying to reinstall the secured software on another computer.

However, if a favorable check takes place the installation utility again creates $K_1$ based on the unique factor obtained from the computer and/or random factor taken from the installation data file. Then it combines $K_1$ with $K_2$ in an algorithm to generate decrypting key K which is applied to decrypt the encrypted part of the mass distributed program and performs the installation procedure as illustrated in block 20.

If the $K_2$ valid for a given $K_1$ was presented during the previous stage the distributed software is decrypted properly and will be properly installed and ready to use. Otherwise the improperly decrypted software could not be installed and run.

Accordingly, although a particular computer software has been distributed, the actual use of that distributed software is limited and controlled by the method employed in the present invention by providing a distinctive and unique key consisting of the user's unique factor and/or random factor, the combination of which would rarely exist for any other user's computer. In addition, a second key is provided which requires a check to be made distinctive to a specific computer or otherwise the use of the distributed program would be prevented. The first and second keys are then combined in an algorithm to provide a decryption key. Therefore, a very simple, efficient and cost-effective distributed computer software protection is provided without using external hardware or other combinations which are costly. In addition, due to the specific unique features of the keys which require no external hardware, duplication of the authorizing second key would be virtually impossible because of the unique and/or random factors which is included in the first key.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. A method of protecting distributed encrypted software of a distributor from unauthorized use by a user in a user's computer comprising the steps of generating data which describes a unique factor of the computer of the user, entering said data along with a random factor into a file of the computer of the user, generating a first key based on said data and said random factor, transmitting the first key to a processing center which controls the user of the distributed program, sending a second key from the processing center to the user which second key is related to said user's first key, entering the second key in the user's computer for regenerating said file in the user's computer, comparing said file in said user's computer with said regenerated file, denying access to said encrypted software when said comparison fails to produce a match, and combining said first and second key by means of an algorithm in said software when a match occurs for providing a decrypting key for decrypting the distributed software and decrypting said encrypted software thereby gaining access to said encrypted software.

2. The method as claimed in claim 1 wherein said distributed encrypted software has a plurality of different programs and program combinations including the steps of encrypting each program and program combination with a different algorithm and first key, generating a different second key from said processing center for each program and program combination, thereby enabling the user to select the program desired.

3. A method of protecting distributed encrypted software of a distributor from unauthorized use of a user in the user's computer comprising the steps of selecting a unique factor of the computer of the user, generating a first key based on said unique factor, transmitting the first key to a processing center, deriving a second key at the processing center which is related to said first key, entering the second key in the user's computer, regenerating said unique factor of said first key in the user's computer using said second key, reading and comparing said unique factor with said regenerated unique factor, denying access to said encrypted software when a match is not provided by said comparing step, combining said first and second key by means of an algorithm in said software for generating a decrypting key for decrypting the distributed software, and decrypting said encrypted software thereby gaining access to said encrypted software.

4. The method as claimed in claim 3 including the step of integrally incorporating said unique factor in the computer of the user.

5. The method as claimed in claim 3 including the steps of generating data which identifies an original file and constitutes said unique factor of the computer of the user, entering said original file into said computer of the user, and deriving said first key from said original file.

6. The method of protecting mass distributed encrypted software of a distributor from unauthorized use of a user in a user's computer comprising the steps of selecting data which comprises a random factor for the user's computer, storing said data into a file of the user's computer, generating a first key based on said file, transmitting the first key to a processing center, deriving a second key at said processing center based on said first key, transmitting said second key from the processing center to the user, entering the second key in the user's computer, reading said file containing said random factor, regenerating said first key from said stored random factor, comparing said file with said regenerated first key, denying access to said encrypted software in the absence of a match in said comparison step, and combining said first and second key by means of an algorithm in said software for generating a decrypting key for decrypting the mass distributed software, and decrypting said encrypted software thereby permitting the user to gain access to said software.

* * * * *